(12) United States Patent
Perrin et al.

(10) Patent No.: US 10,008,179 B2
(45) Date of Patent: Jun. 26, 2018

(54) METHOD FOR OVERLAYING AN IMAGE ARISING FROM A SENSOR ON A SYNTHETIC IMAGE BY AUTOMATIC DETECTION OF THE LIMIT OF VISIBILITY AND ASSOCIATED VIEWING SYSTEM

(71) Applicant: THALES, Courbevoie (FR)

(72) Inventors: Baptiste Perrin, Merignac (FR); Thierry Ganille, Merignac (FR); Johanna Lux, Merignac (FR)

(73) Assignee: THALES, Courbevoie (FR)

( * ) Notice: Subject to any disclaimer, the term of this patent is extended or adjusted under 35 U.S.C. 154(b) by 0 days. days.

(21) Appl. No.: 15/786,473

(22) Filed: Oct. 17, 2017

(65) Prior Publication Data

US 2018/0122331 A1 May 3, 2018

(30) Foreign Application Priority Data

Nov. 3, 2016 (FR) ...................................... 16 01574

(51) Int. Cl.
*G08B 21/00* (2006.01)
*G09G 5/02* (2006.01)
(Continued)

(52) U.S. Cl.
CPC ............... *G09G 5/02* (2013.01); *G01C 21/00* (2013.01); *G01C 23/00* (2013.01); *G02B 27/01* (2013.01);
(Continued)

(58) Field of Classification Search
CPC ...... G01C 23/00; G01C 21/00; G08G 5/0021; G02B 27/01; G06T 17/05; G09G 5/02
(Continued)

(56) References Cited

U.S. PATENT DOCUMENTS 7,605,719 B1  10/2009  Wenger et al.
8,493,241 B2*  7/2013  He .......................... G01C 23/00
                                                340/945
(Continued)

FOREIGN PATENT DOCUMENTS

FR    2 996 670 A1    4/2014
FR    2 996 671       4/2014

OTHER PUBLICATIONS

Oleg Vygolov et al., "Enhanced, Synthetic and Combined Vision Technologies for Civil Aviation," Computer Vision in Control Systems—2, Oct. 31, 2014, pp. 201-230, XP009191658.

*Primary Examiner* — Mark Rushing
(74) *Attorney, Agent, or Firm* — Baker & Hostetler LLP

(57) ABSTRACT

An on-board viewing system for aircraft of an image arising from an image sensor overlaid on a synthetic image of the outside landscape is provided. The method comprises the following steps: analysis, at a temporal frequency, of the sensed images so as to determine, in each image, a boundary between the information useful for piloting and the non-useful information, the useful information consisting of noteworthy elements, the temporal frequency being an order of magnitude lower than the video refresh frequency; determination of a transition zone in the vicinity of each boundary; display on the viewing screen, at the video refresh frequency, of the sensed images, each sensed image being displayed overlaid on a synthetic image of the landscape, the sensed image being opaque under the transition zone, totally transparent above the transition zone and of continuously variable transparency in the transition zone.

10 Claims, 3 Drawing Sheets

(51) Int. Cl.
  *G02B 27/01* (2006.01)
  *G01C 21/00* (2006.01)
  *G06T 17/05* (2011.01)
  *G08G 5/00* (2006.01)
  *G01C 23/00* (2006.01)

(52) U.S. Cl.
  CPC ........... *G06T 17/05* (2013.01); *G08G 5/0021* (2013.01); *G02B 2027/014* (2013.01); *G02B 2027/0138* (2013.01)

(58) Field of Classification Search
  USPC ........................................................ 340/974
  See application file for complete search history.

(56) References Cited

U.S. PATENT DOCUMENTS

| | | | |
|---|---|---|---|
| 9,243,910 B1 * | 1/2016 | Esno | G01C 21/00 |
| 9,584,791 B1 * | 2/2017 | Whalen | H04N 13/0018 |
| 2008/0180351 A1 | 7/2008 | He | |
| 2010/0113149 A1 | 5/2010 | Suddreth et al. | |
| 2010/0283782 A1 | 11/2010 | He | |
| 2011/0227944 A1 | 9/2011 | Feyereisen et al. | |
| 2012/0026190 A1 | 2/2012 | He et al. | |
| 2012/0035789 A1 | 2/2012 | He | |
| 2014/0267422 A1 | 9/2014 | Feyereisen et al. | |

* cited by examiner

METHOD FOR OVERLAYING AN IMAGE ARISING FROM A SENSOR ON A SYNTHETIC IMAGE BY AUTOMATIC DETECTION OF THE LIMIT OF VISIBILITY AND ASSOCIATED VIEWING SYSTEM

CROSS-REFERENCE TO RELATED APPLICATION

This application claims priority to foreign French patent application No. FR 1601574, filed on Nov. 3, 2016, the disclosures of which are incorporated by reference in their entirety.

FIELD OF THE INVENTION

The general field of the invention is that of man-machine interfaces for the piloting of aircraft and, more precisely, that of viewing systems which combine synthetic image of the outside landscape and real image given by a sensor.

BACKGROUND

Synthetic imaging systems are known by the acronym "SVS", standing for "Synthetic Vision System". Real imaging systems are known by the acronym "EVS", standing for "Enhanced Vision System". The sensors used are, for example, infrared sensors, millimeter wave radars or else low-light-level sensors.

The combination of the two systems is called "CVS", standing for "Combined Vision System". "CVS" imaging can be displayed on a screen in "head-down" mode or a "head-up" viewing device, worn or not by the user.

SVS imaging considerably enhances the awareness of the situation of the crew by displaying an image of the outside scene that is independent of the meteorological conditions. But the inaccuracies of satellite location and/or the lack of integrity of the databases do not allow this system to be adequate for its use during low-altitude flight or landing. Its use is therefore relevant for displaying terrain relatively distant from the aircraft.

An enhanced vision system EVS is an electronic means for providing an image of the outside scene that is enhanced with respect to natural vision by virtue of the use of an imaging sensor. The pilot therefore has real-time information of the outside. EVS increases visibility at night and in bad weather but, in the latter case, its effectiveness is limited and variable as a function of the types of fog and types of sensors used. Its use is therefore relevant above all when one is relatively close to the terrain.

The objective of CVS imaging is to best exploit the above two systems by combining them. The functions expected of CVS are based on those of EVS and of SVS taken individually, together with a bonus afforded by a relevant combination. These functions hinge around two features:

Improving the awareness of the situation of the crew in relation to the terrain, relevant obstacles and cultural elements, which may include towns, roads, rivers, helipads, runways, the environment of the airport, etc. thus offering the ability to continue a so-called "VFR" flight under reduced visibility at night or in bad weather;

Making up for the visual references required in "IFR" thus offering the aircraft the ability to descend under the minima authorized in the case of so-called "ILS CAT I" or "LPV" approaches on aerodrome or in the case of approaches on heliport of "Point in Space" type, or else in the case of off-shore approaches.

A first solution consists in overlaying the entire EVS image on the SVS image, thus masking a useful part of the SVS, optionally with registration of the SVS image on the EVS image by identifying a noteworthy element such as a landing runway. This representation necessarily limits the cases of use. It is illustrated in FIG. 1. In this figure, the SVS image is represented in wire-form and the EVS image as dotted zones. The symbology S is represented by simple geometric figures. This basic solution consisting in displaying the entire EVS image without transparency on the wider-field SVS image is not very satisfactory since the EVS image masks the useful information of the SVS image for all the parts representing distant terrain which the sensor does not penetrate.

A second possible scheme consists in proposing a transition between the EVS image and the SVS image. The problem to be solved is then to find a solution which makes it possible to overlay one image on the other and to pass from one to the other while maximizing the added value of each system. Indeed, beyond a certain distance between the terrain and the aircraft, which depends on the weather conditions and also on the air regulation applicable to the flight, the SVS image must then be predominant since the visibility of the EVS sensor does not make it possible to display a utilizable image to the crew of the aircraft. Conversely, below a certain distance from the terrain, the EVS image must be predominant since the SVS image may be a source of errors due to the inaccuracy of the location of the craft and of the databases.

Various possible criteria and various forms of transition exist. A first solution consists in displaying the EVS image only below the horizon and displaying the SVS image only above. A variant to this solution is described in Honeywell patent application US20120026190. The rendition of the "EVS" image on the "SVS" image is carried out with a first colour and a first transparency above the horizon and a second colour and a second transparency below the horizon. This all or nothing solution does not always best exploit the potential of the two images.

This solution is less brutal than the total overlaying of the EVS image on the SVS image. It has its limits however. In poor visibility due to fog or to snow, for example, the sensor does not penetrate as far as the horizon. Some useful information of the SVS may thus be masked through absence of transparency. This solution may also introduce confusion on the parts close to the terrain since the inaccuracy of the location and/or of the data arising from the databases may lead to a double display with shifting of the position of certain elements of the terrain or of obstacles or of landing runways.

A second type of transition solution is based on the analysis of the images themselves. A first variant consists in detecting the zones having a contrast greater than a given threshold in the EVS image and overlaying only these high-contrast zones on the SVS image. Patent application US2010283782 describes a fusion of images associating different colours or textures according to the type of SVS and EVS data. Patent application US2011227944 describes a fusion of SVS and EVS images after filtering of the EVS image by intensity threshold or frequency threshold, the two images being able to be distinguished by different formats and colours. U.S. Pat. No. 7,605,719 describes a solution which is much the same. Replacing the non-useful zones of the sensor's image with SVS imaging can render the CVS display confused. Indeed, the various replaced zones are not adjoining, the EVS image then exhibits "holes". It is no longer possible to distinguish what arises from the image of the tracker or what arises from the synthetic image, and this may make it difficult for the pilot to interpret the resulting image.

Another type of solution consists in analysing the "semantic" content of the image. Thus, patent application US2008180351 describes a method for enhancing the EVS image around a point of interest that is known through the SVS database. Patent application US2012035789 employs this principle, applying it specifically to the approach ramps. Patent application US2010113149 describes the display in an SVS image of portions of images of one or more sensors representing a noteworthy element such as a landing runway or a fixed or mobile obstacle. U.S. Pat. No. 7,605,719 describes the detection of the useful and non-useful zones of the image arising from the tracker and the replacing of the non-useful zones with synthetic terrain, without giving more details.

The local enhancement of the EVS image or cropping around a point of interest known from the database operates only if there is actually a point of interest overflown and stored in database, typically a landing runway. This solution is not always satisfactory, for example, during low-altitude flights, typical of a helicopter mission where the helicopter flies constantly close to the ground without, however, frequently overflying points of interest stored in a database.

Another solution consists in determining by various means a visibility distance and in computing, as a function of this distance, the boundary separating the two images, SVS and EVS. Thus, patent FR2996670 claims the partial masking of an SVS image by the computation of the intersection of a sphere centred on the aeroplane or of a plane perpendicular to the aeroplane axis with the terrain, as a function of a visibility distance computed automatically or advised by the operator. Patent FR2996671 describes the partial masking of an SVS image around the landing runway and in a, wider, zone at the front of the runway whose length depends on the so-called "DH/A" approach procedure, the acronym standing for "Decision Height/Altitude". In these two patents, the masked zone serves to display the sensor image.

This type of solution introduces an abrupt break between the EVS image and the SVS image which is not necessarily appreciated by pilots since the range limit of the sensor in poor visibility is not sharp and constant. Moreover, this solution requires the knowledge of the value of the visibility distance and may not be modified simply, for example, if the visibility distance changes over time.

Finally, it is also possible to separate the image arising from the tracker into three rectangular distinct zones. A first zone, at the bottom of the image is totally or almost opaque, the zone at the top of the image is totally or almost transparent, and the transition zone comprises a vertical linear opacity gradation. The drawback of this solution is that the boundary between the useful and non-useful zones is not determined. Thus, this solution is not optimal when the visibility of the sensor's image does not correspond to the distribution of the zones. In certain cases, useful information arising from the SVS is masked by a part of the sensor's image which turns out to be unutilizable. Finally, this solution based on rectangular zones is less appropriate when flying close to a craggy relief since, in this case, the limit of visibility is no longer a straight line.

SUMMARY OF THE INVENTION

The solution according to the invention rests upon the idea of favouring the bottom of the sensor image corresponding to the close terrain to be monitored while leaving greater room for the SVS image for the distant terrain in the top part of the image so as to enhance awareness of the situation. The EVS image is overlaid on the SVS image with a variable opacity between the various parts detected beforehand, delimited by a computed boundary. The bottom of the image is very or completely opaque and the top of the image is very or completely transparent with an opacity transition of a certain predetermined width between the bottom and top parts. More precisely, the subject of the invention is a method of graphical representation in an on-board viewing system for aircraft of a first image arising from an image sensor of the outside landscape overlaid on a second image representing a synthetic image of the same outside landscape, the two images being displayed on a viewing screen of the viewing system, characterized in that the method comprises the following steps:

Analysis, at a temporal frequency, of a first series of first images arising from the image sensor so as to determine, inside each image, a boundary between the information useful for piloting and the information not useful for piloting, the useful information consisting of portions of terrain or of obstacles or of elements of interest that are noteworthy, the said temporal frequency being an order of magnitude lower than the video refresh frequency of the images displayed on the viewing screen, these first images being denoted analysed images;

Determination of a transition zone in the vicinity of each boundary of a determined width;

Display on the viewing screen, at the video refresh frequency, of a second series of first images between two successive analysed images, each first image being displayed overlaid on a second image representing a synthetic image of the same outside landscape, the first image being opaque under the transition zone, totally transparent above the transition zone and of continuously variable transparency varying between opacity and total transparency in the transition zone.

Advantageously, between two first images displayed successively at the video refresh frequency, the position and the inclination of the boundary corresponding to the said images are slaved to the attitude of the aircraft in pitch, roll and yaw and to the variations of rotation of the image sensor.

Advantageously, the transition between two boundaries that are computed successively at the temporal frequency is carried out by means of a morphosis.

Advantageously, the transition zone is either centred on the boundary, or situated below the latter, or situated above the latter.

Advantageously, the first images arising from the image sensor and the second synthetic images are in different colour ranges.

The invention also relates to an on-board viewing system for aircraft comprising at least one image sensor of the outside landscape, a cartographic database, a graphics computer arranged so as to generate a synthetic image of the same outside landscape, a viewing screen displaying a first image arising from the image sensor overlaid on a second image representing the synthetic image, characterized in that the viewing system comprises:

means for image analysis, at a temporal frequency, of a first series of first images arising from the image sensor so as to determine, inside each image, a boundary between the information useful for piloting and the information not useful for piloting, the useful information consisting of portions of terrain or of obstacles or of elements of interest that are noteworthy, the said temporal frequency being an order of magnitude lower than the video refresh frequency of the images displayed on the viewing screen, these first images being denoted analysed images;

first means for computing a transition zone in the vicinity of each boundary of a determined width;

the graphics computer displaying, at the video refresh frequency, a second series of first images between two successive analysed images, each first image being displayed overlaid on a second image representing a synthetic image of the same outside landscape, the first image being opaque under the transition zone, totally transparent above the transition zone and of continuously variable transparency varying between opacity and total transparency in the transition zone.

Advantageously, between two first images displayed successively at the video refresh frequency, the position and the inclination of the boundary corresponding to the said images are slaved to the attitude of the aircraft in pitch, roll and yaw and to the variations of rotation of the image sensor.

Advantageously, the transition between two boundaries that are computed successively at the temporal frequency is carried out by means of a morphosis.

Advantageously, the image sensor is an infrared camera or a light-intensifier-based device or a millimeter wave sensor.

Advantageously, the viewing screen is a screen of the instrument panel or a fixed head-up viewing device screen or a worn head-up viewing device screen or an on-windscreen projection device screen.

BRIEF DESCRIPTION OF THE DRAWINGS

The invention will be better understood and other advantages will become apparent on reading the nonlimiting description which follows and by virtue of the appended figures among which.

DETAILED DESCRIPTION

The method according to the invention is implemented in a viewing system comprising the means necessary for the display of a synthetic image of the outside landscape, of a real image of the outside landscape, image processing means making it possible to analyse the real image and graphical processing means making it possible to ensure the overlaying of the real image on the synthetic image.

The means necessary for the display of a synthetic image comprise a cartographic database of the terrain overflown, sensors making it possible to geolocate the craft and its attitude in space, graphics computation means making it possible to generate a three-dimensional synthetic image corresponding to the terrain overflown and a viewing device. It is known that in modern aircraft, these viewing devices can take diverse forms. They may be instrument panel viewing screens, transparent projection screens, fixed Head-Up viewing devices or ones worn by the user.

The means necessary for the capture of a real image are essentially an image sensor. This image sensor can be an infrared camera or a light-intensifier-based device or a millimeter wave sensor.

In the method according to the invention, the image processing means make it possible to analyse the real image so as to determine, inside each image, a boundary between the information useful for piloting and the information not useful for piloting, the useful information consisting of portions of terrain or of obstacles or of elements of interest that are noteworthy. The zones of the image divested of information are, for example, the sky or zones of the terrain that are covered by mist. This amounts to detecting the limit of visibility of the image arising from the sensor.

Figure 1:
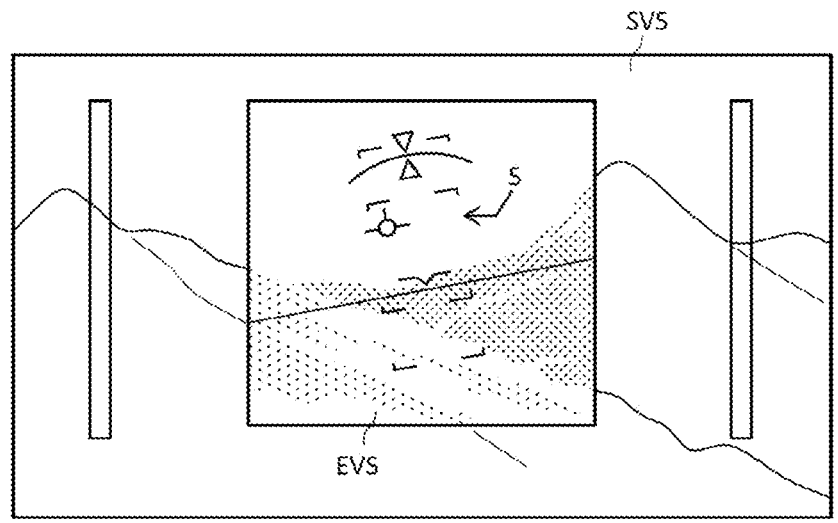
FIG. 1 represents an EVS image overlaid on an SVS image according to the prior art.
Figure 2:
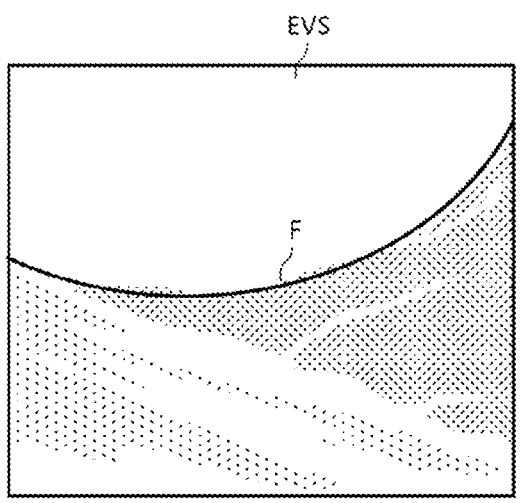
FIG. 2 represents a boundary according to the invention in an image arising from a sensor.

This step of the method is represented in FIG. 2. In this figure, the terrain zones are represented by dotted surfaces and the sky by white. After processing, the boundary determined is the concave line represented in bold. The shape of this boundary is given only by way of indication. It is however preferable that the boundary is a simple shape.

The video refresh frequencies do not make it possible for this image analysis to be done in real time. In the method according to the invention, this analysis is done at a lower frequency than the video frequency. By way of example, this frequency is an order of magnitude lower than the video frequency.

Figure 3:
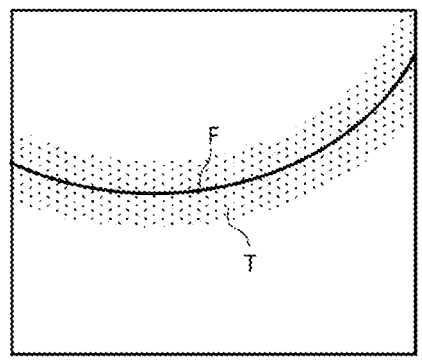
FIGS. 3, 4 and 5 represent the various positions of the transition zone in the vicinity of the boundary.
Figure 4:
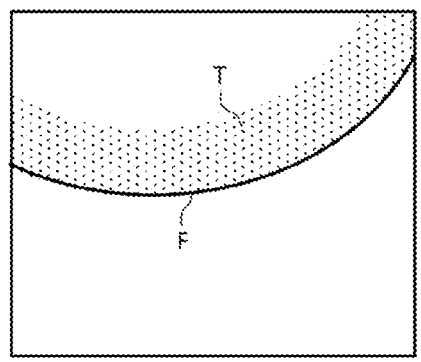
Figure 5:
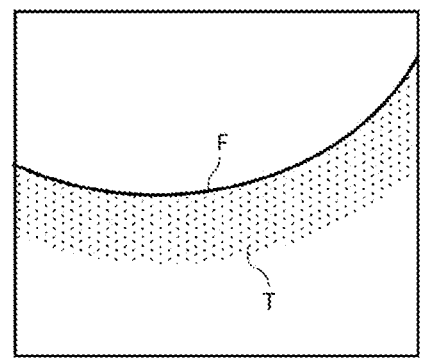

Once this boundary has been computed, a transition zone in the vicinity of this boundary is determined. This transition zone has a width which, by way of example, may be equal to 10% of the width of the image. As seen in FIGS. 3, 4 and 5, this transition zone may be either centred on the boundary, or situated below the latter, or situated above the latter.

Figure 6:
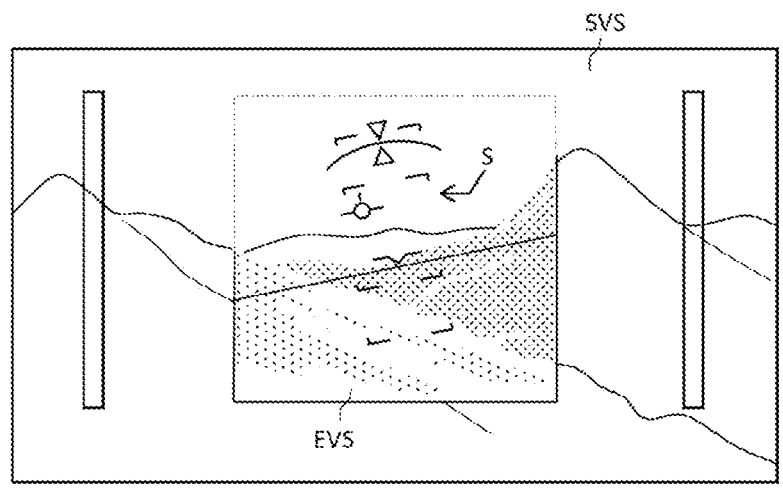
FIG. 6 represents an EVS image overlaid on an SVS image according to the invention.

In the next step of the method, the real image is displayed overlaid on the synthetic image in the following manner. The real image is opaque under the transition zone, totally transparent above the transition zone and of continuously variable transparency varying between opacity and total transparency in the transition zone. If the number of values of transparency possible is limited, then a conventional so-called "dithering" algorithm can be introduced to obtain transitions that are invisible to the eye between each transparency level. FIG. 6 represents an EVS image overlaid on an SVS image according to the invention. In this figure, the outline of the opaque part is represented solid and the outline of the transparent part is represented dotted. In this figure, it is noted that the synthetic landscape in the background symbolized by a line of crests has reappeared.

Figure 7:
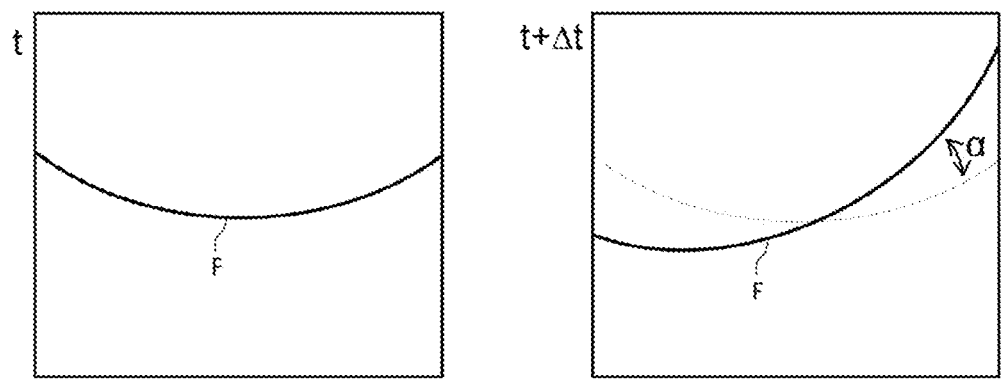
FIG. 7 illustrates the movements of the boundary as a function of the attitude of the aircraft.
Figure 7:

As was stated, the boundary is computed at a smaller frequency than the video refresh frequency. Between a first computation of the boundary and the next computation, the same computed boundary is used for the display of a certain number of video images. It is beneficial to make this boundary evolve in a simple manner with the movements of the aeroplane in such a way that between two computed images, the boundary continues to best hug the useful zones of the image. Thus, between two images displayed successively at the video refresh frequency, the position and the inclination of the boundary corresponding to the images are slaved to the attitude of the aircraft in pitch, roll and yaw. FIG. 7 illustrates this evolution. The boundary has been computed at the instant t, for a first position of the aircraft A. At the instant t+Δt, the roll of the aircraft has increased by an angle α, in order that the boundary continues to hug the landscape, the boundary tilts by an angle −α. In this figure, for the sake of clarity, the roll angles are noticeably exaggerated between two successive images.

In the case of a mobile image sensor, the slaving of the boundary to the yaw is different. Indeed, as the curve is extrapolated at the ends, it may happen that the boundary diverges. Thus, with a mobile camera, the boundary is not extrapolated but it can be lengthened by a straight line parallel to the horizon.

In the same manner, it is preferable that the passage from one computed image to the next computed image be done with a gentle transition. To this end, it is possible to use a morphosis algorithm also known as "morphing" to pass from one computed boundary to the next.

To clearly distinguish what pertains to each image and if the displays are colour displays, the images arising from the image sensor and the synthetic images may be in different colour ranges.

The invention claimed is:

1. A method of graphical representation in an on-board viewing system for aircraft of a first image (EVS) arising from an image sensor of the outside landscape overlaid on a second image (SVS) representing a synthetic image of the same outside landscape, the two images being displayed on a viewing screen of the viewing system, wherein the method comprises the following steps:
    analysis, at a temporal frequency, of a first series of first images arising from the image sensor so as to determine, inside each image, a boundary (F) between the information useful for piloting and the information not useful for piloting, the useful information consisting of portions of terrain or of obstacles or of elements of interest that are noteworthy, the said temporal frequency being an order of magnitude lower than the video refresh frequency of the images displayed on the viewing screen, these first images being denoted analysed images;
    determination of a transition zone (T) in the vicinity of each boundary of a determined width;
    display on the viewing screen, at the video refresh frequency, of a second series of first images between two successive analysed images, each first image being displayed overlaid on a second image representing a synthetic image of the same outside landscape, the first image being opaque under the transition zone, totally transparent above the transition zone and of continuously variable transparency varying between opacity and total transparency in the transition zone.

2. The method of graphical representation according to claim 1, wherein, between two first images displayed successively at the video refresh frequency, the position and the inclination of the boundary corresponding to the said images are slaved to the attitude of the aircraft in pitch, roll and yaw and to the variations of rotation of the image sensor.

3. The method of graphical representation according to claim 1, wherein the transition between two boundaries that are computed successively at the temporal frequency is carried out by means of a morphosis.

4. The method of graphical representation according to claim 1, wherein the transition zone is either centred on the boundary, or situated below the latter, or situated above the latter.

5. The method of graphical representation according to claim 1, wherein the first images arising from the image sensor and the second synthetic images are in different colour ranges.

6. An on-board viewing system for aircraft comprising at least one image sensor of the outside landscape, a cartographic database, a graphics computer arranged so as to generate a synthetic image of the same outside landscape, a viewing screen displaying a first image arising from the image sensor overlaid on a second image representing the synthetic image, wherein the viewing system comprises:
    means for image analysis, at a temporal frequency, of a first series of first images arising from the image sensor so as to determine, inside each image, a boundary between the information useful for piloting and the information not useful for piloting, the useful information consisting of portions of terrain or of obstacles or of elements of interest that are noteworthy, the said temporal frequency being an order of magnitude lower than the video refresh frequency of the images displayed on the viewing screen, these first images being denoted analysed images;
    first means for computing a transition zone in the vicinity of each boundary of a determined width;
    the graphics computer displaying, at the video refresh frequency, a second series of first images between two successive analysed images, each first image being displayed overlaid on a second image representing a synthetic image of the same outside landscape, the first image being opaque under the transition zone, totally transparent above the transition zone and of continuously variable transparency varying between opacity and total transparency in the transition zone.

7. The on-board viewing system for aircraft according to claim 6, wherein, between two first images displayed successively at the video refresh frequency, the position and the inclination of the boundary corresponding to the said images are slaved to the attitude of the aircraft in pitch, roll and yaw and to the variations of rotation of the image sensor.

8. The on-board viewing system for aircraft according to claim 6, wherein the transition between two boundaries that are computed successively at the temporal frequency is carried out by means of a morphosis.

9. The on-board viewing system for aircraft according to claim 6, wherein the image sensor is an infrared camera or a light-intensifier-based device or a millimeter wave sensor.

10. The on-board viewing system for aircraft according to claim 6, wherein the viewing screen is a screen of the instrument panel or a fixed head-up viewing device screen or a worn head-up viewing device screen or an on-windscreen projection device screen.

* * * * *